United States Patent
Kamiya (10) Patent No.: US 7,227,651 B2
(45) Date of Patent: Jun. 5, 2007

(54) IMAGE PROCESSING APPARATUS, CONTROL METHOD THEREOF, AND STORAGE MEDIUM

(75) Inventor: Yuka Kamiya, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 912 days.

(21) Appl. No.: 10/077,796

(22) Filed: Feb. 20, 2002

(65) Prior Publication Data
US 2002/0118383 A1    Aug. 29, 2002

(30) Foreign Application Priority Data
Feb. 21, 2001   (JP)   ............................ 2001-045341

(51) Int. Cl.
*G06K 15/00*   (2006.01)
*G06F 3/12*    (2006.01)

(52) U.S. Cl. .................. 358/1.14; 358/1.13; 358/1.15

(58) Field of Classification Search ................. 358/1.1, 358/1.6, 1.12, 1.13, 1.14, 1.15, 1.16, 1.17, 358/1.18, 407, 437, 442, 468; 347/1, 2, 3, 347/5; 399/1, 8, 11, 14, 18, 19, 20, 9
See application file for complete search history.

(56) References Cited

U.S. PATENT DOCUMENTS

| | | | |
|---|---|---|---|
| 6,369,905 B1* | 4/2002 | Mitsuhashi et al. | ........ 358/1.15 |
| 6,388,759 B1* | 5/2002 | Yoshida et al. | ............ 358/1.13 |
| 6,885,469 B1* | 4/2005 | Tanimoto | .................. 358/1.14 |

* cited by examiner

*Primary Examiner*—Dov Popovici
(74) *Attorney, Agent, or Firm*—Fitzpatrick, Cella, Harper & Scinto (57) ABSTRACT

To be able to effectively use an image processing apparatus having plural functions and execute an effective use of the image processing apparatus under a condition of reflecting user's will, use environment of the image processing apparatus and the like, an error in the image processing apparatus is detected by a detector, and a screen including a function restriction key for restricting the function of the image processing apparatus is displayed in accordance with detection by the detector.

42 Claims, 6 Drawing Sheets

- AGAIN TURN ON POWER SUPPLY ON THE RIGHT OF BODY — 3022

FINISHING FUNCTION CANNOT BE USED PARTIALLY.
IF APPARATUS DOES NOT OPERATE NORMALLY
AFTER ABOVE OPERATION, INFORM SERVICEPERSON
OF UNDERMENTIONED CODE.
IF CHANGE TO FUNCTION RESTRICTION MODE,
PERFORM ABOVE OPERATION AFTER DEPRESSING
UNDERMENTIONED BUTTON.

- 1234567890  [ FUNCTION RESTRICTION ] — 3021

- AGAIN TURN ON POWER SUPPLY ON THE RIGHT OF BODY

IF APPARATUS DOES NOT OPERATE NORMALLY
AFTER ABOVE OPERATION, INFORM SERVICEPERSON
OF UNDERMENTIONED CODE.

- 2234567890

FIG. 7

IMAGE PROCESSING APPARATUS, CONTROL METHOD THEREOF, AND STORAGE MEDIUM

BACKGROUND OF THE INVENTION

1. Field of the Invention

The present invention relates to a control operation in an image processing apparatus having plural functions.

2. Related Background Art

Conventionally, in an image processing apparatus including an image formation apparatus such as a copying machine or the like, if a service call error (i.e., an error to which a serviceperson is necessary) occurs, a screen for urging a user to reset the power supply (i.e., to once turn off and then turn on the power) is displayed together with a notification of service call, and then all the processes in the image processing apparatus are stopped.

However, even if such the service call error occurs, a device which has to be repaired or exchanged by the serviceperson is often a part of the image processing apparatus. In such a situation, there is a problem that, although devices other than the device to which the error occurs can normally operate, the image processing apparatus can not be used as a whole until the repair is completed by the serviceperson.

SUMMARY OF THE INVENTION

An object of the present invention is to provide an image processing apparatus which solved the above problem, a control method for the above apparatus, and a storage medium for a program to achieve the above method.

Another object of the present invention is to provide an image processing apparatus which can be effectively used, a control method for the above apparatus, and a storage medium for a program to achieve the above method.

Still another object of the present invention is to provide an image processing apparatus which can prevent inconvenience of putting a load such as confusion or the like on a user due to a purpose of effective use of the image processing apparatus having plural functions, and can be effectively used in consideration of user's will, use environment of the image processing apparatus and the like, a control method of the above apparatus, and a storage medium for a program to achieve the above method.

Other objects and features of the present invention will become apparent from the following detailed description and the attached drawings.

DETAILED DESCRIPTION OF THE PREFERRED EMBODIMENT

Figure 1:
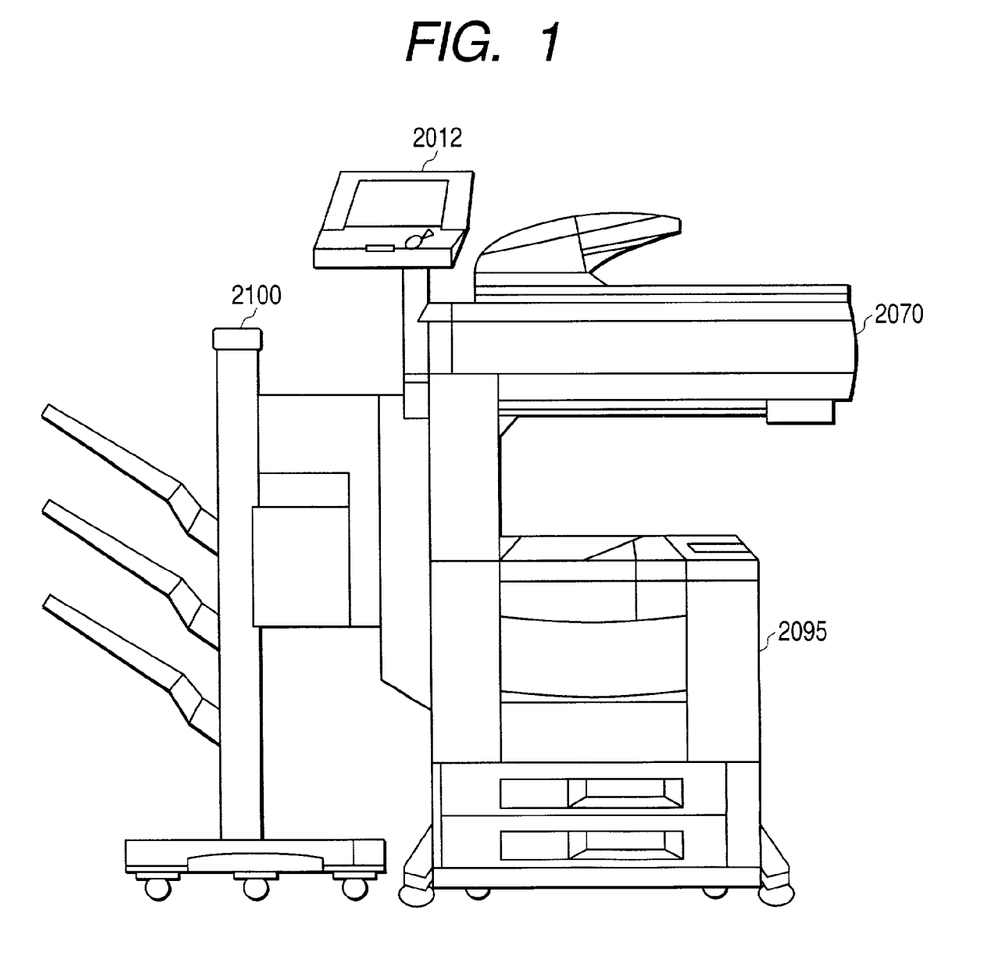
FIG. 1 is a schematic structural view of an image processing apparatus in the embodiment of the present invention.
Figure 2:
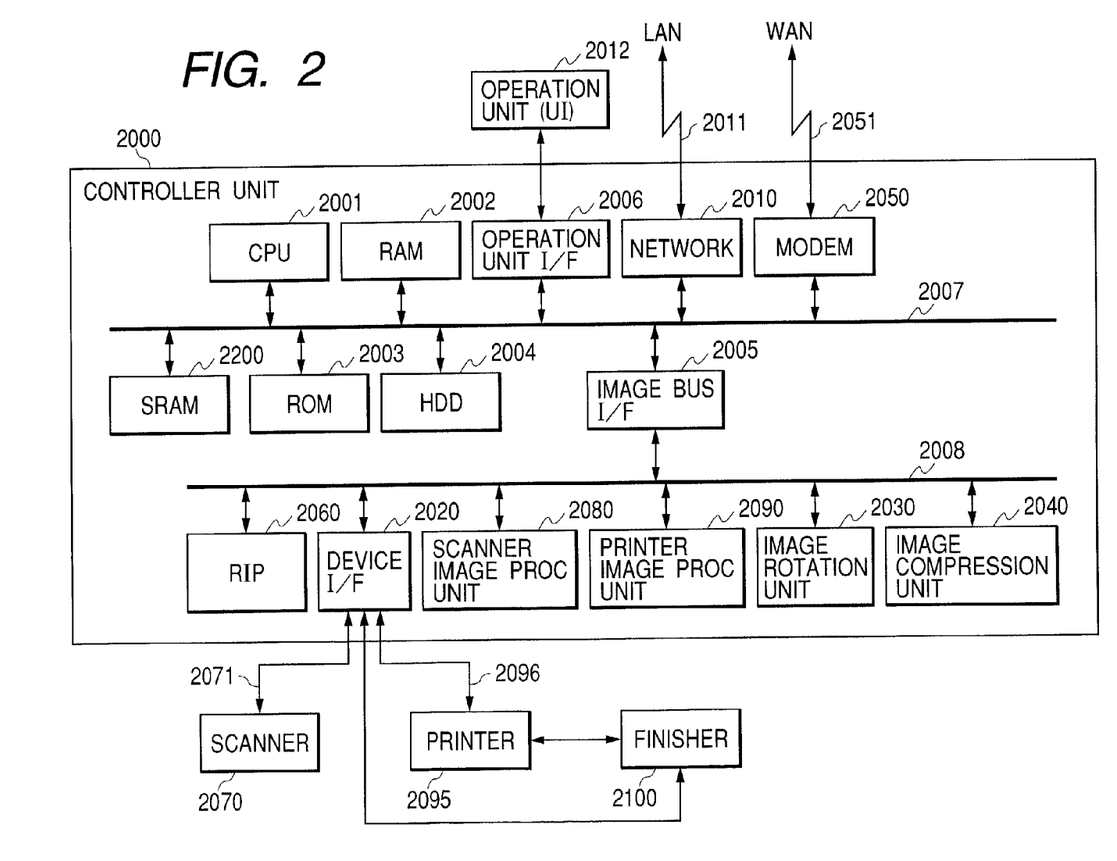
FIG. 2 is a block diagram of the image processing apparatus.

A schematic structural view and a block diagram of an image processing apparatus according to the embodiment of the present invention are respectively shown in FIGS. 1 and 2. A controller unit 2000 is connected to a scanner 2070 being an image input device or a printer 2095 being an image output device, while connected to a LAN (local area network) 2011 or a public line (WAN (wide area network)) 2051 to act as a controller for performing an input/output operation of image information or device information with an external device such as the scanner 2070, a computer or the like. A CPU (central processing unit) 2001 is a controller for controlling an entire system. A RAM (random-access memory) 2002 is a system work memory for the operation of the CPU 2001, and also an image memory for the temporary storage of image data. An SRAM (static random-access memory) 2200 which is a memory for storing information regarding the system is backed up by a battery. A ROM (read-only memory) 2003 is a boot ROM, in which a boot program of the system is stored. An HDD (hard disk drive) 2004 stores system software and image data. An operation unit I/F (interface) 2006 outputs image data to be displayed on an operation unit 2012 to the operation unit 2012 by the operation unit (UI (user interface)) 2012 and an interface unit. The operation unit I/F 2006 also acts to notify information input from the operation unit 2012 by a user of the present system to the CPU 2001. A network 2010 connected to the LAN 2011 inputs and outputs information. A modem 2050 connected to the public line 2051 inputs and outputs information. The above devices are arranged on a system bus 2007. An image bus I/F 2005 being a bus bridge for converting data structure connects the system bus 2007 with an image bus 2008, which transfers image data at high speed. The image bus 2008 is structured by a PCI (Peripheral Component Interconnect) bus or an IEEE1394 (Institute of Electrical and Electronics Engineers 1394) bus. On the image bus 2008, the following devices are arranged. An RIP (raster image processor) 2060 expands PDL (page description language) codes into bit map image data. A device I/F unit 2020 connects the scanner 2070 being the image input device, the printer 2095 and a finisher 2100 to the controller unit 2000 and performs a conversion of synchronous system/asynchronous system of the image data. A scanner image processing unit 2080 performs a correcting operation, a processing operation and an editing operation to input image data. A printer image processing unit 2090 performs a correction of print, a resolution conversion or the like to print output image data. An image rotation unit 2030 rotates the image data. An image compression unit 2040 executes a compression/expansion process based on a JPEG (Joint Photographic Coding Experts Group) encoding system to multivalue image data, and that process based on a JBIG (Joint Bi-level Image Experts Group) system, an MMR (Modified Modified Relative element address) system or an MH (Modified Huffman) encoding systems to binary image data. Sheets to which a printing process are executed by the printer 2095 are transported to the finisher 2100, then discharged to a tray.

The finisher 2100 has various sheet processing units (not shown) for executing various sheet processes such as a stapler unit for executing a stapling process to the sheets transported from the printer unit 2095, a fold processing unit for executing a folding process to the sheets, a binding processing unit, a punch unit for executing a punching process to the sheets, and the like. The finisher 2100 is structured capable of executing the sheet process according to an instruction from a user to the sheets transported from the printer unit 2095. A main control unit (not shown) included in the finisher 2100 is structured capable of obtaining information (includes an operating condition, error information, etc.) of the sheet processing units every sheet processing unit by communicating with those various sheet processing units. Then, the obtained information can be transmitted to the controller unit 2000 and the printer unit 2095. While, if the CPU 2001 in the controller unit 2000 directly communicates with the various sheet processing units without passing through the main control unit in the finisher 2100, the CPU 2001 can also directly obtain the information from the various sheet processing units every sheet processing unit.

As above, the CPU 2001 in the controller unit 2000 is structured capable of communicating with the various units (includes various units such as the HDD 2004, the RIP 2060, the scanner image processing unit 2080, the printer image processing unit 2090, the image rotation unit 2030, the image compression unit 2040, and the like) included in the controller unit, the operation unit 2012, the scanner 2070, the printer 2095 and the finisher 2100 (includes each sheet processing unit) through a signal line, and is structured capable of obtaining status information (includes operating condition, error information, and the like) from each unit by transmitting a status request, whereby totally managing, operating and controlling each of the units.

Figure 3:
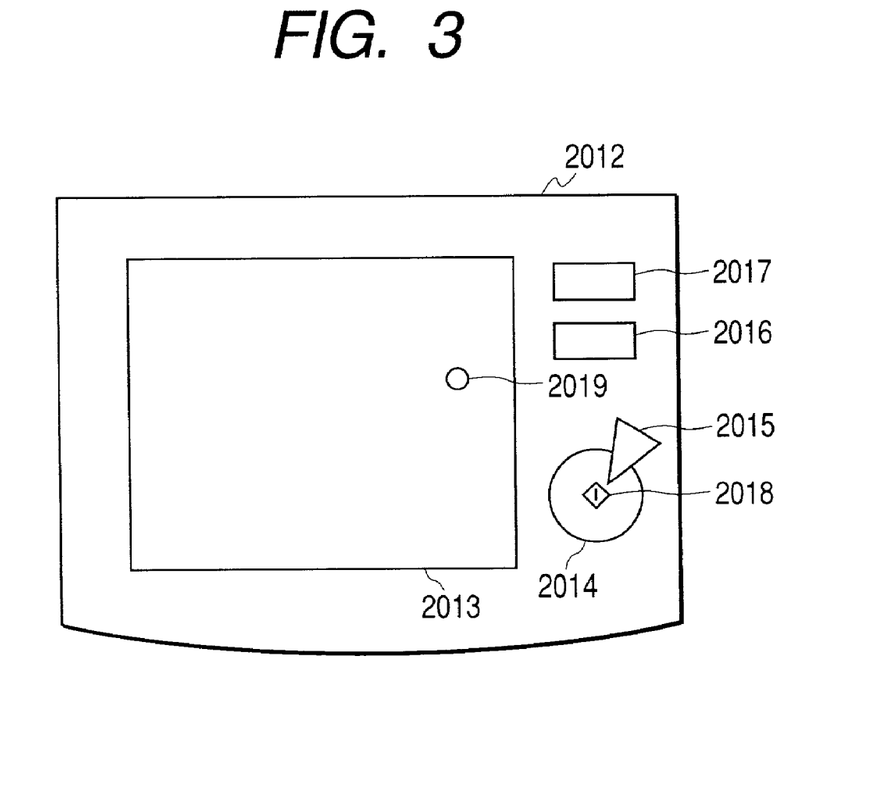
FIG. 3 is a schematic structural view of an operation unit in the image processing apparatus.

The structure of the operation unit 2012 is shown in FIG. 3. With respect to an LCD (liquid crystal display) display unit 2013, a touch panel sheet is adhered on the LCD, where an operation screen of the system is displayed, and when a displayed key is depressed, position information thereof is notified to the controller CPU 2001. A start key 2014 is used when a reading operation of an original image is started. A two-color (green and red) LED (light emitting diode) 2018 is provided at the center of the start key 2014, and those colors indicate whether or not the start key 2014 is in a usable state. A stop key 2015 acts to stop a functioning operation. An ID (identification) key 2016 is used when a user's ID is input. A reset key 2017 is used when the setting instructed from the operation unit is initialized. A user mode key 2019 is used at the time of changing to a screen used for performing user setting (a clock, error priority or the like) related to the own apparatus.

Figure 4:
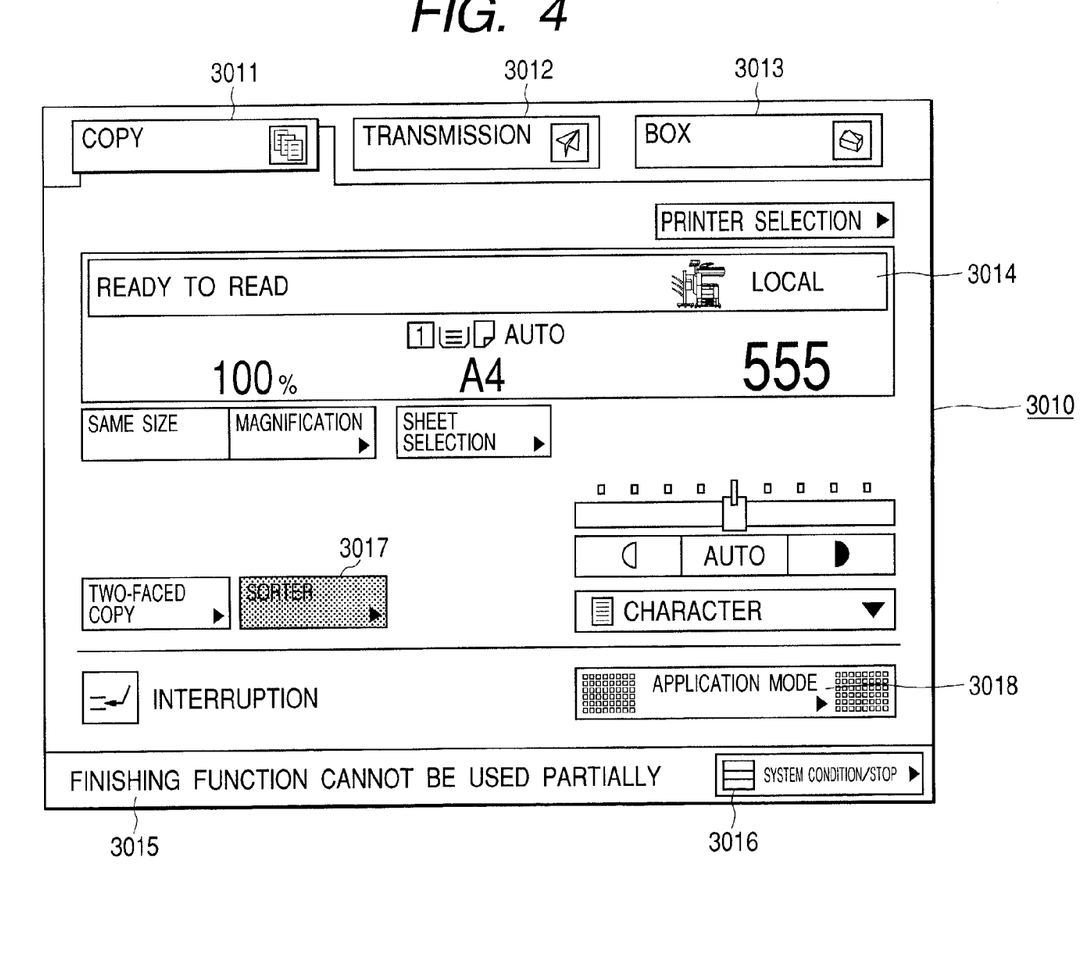
FIG. 4 is a view showing an example of a basic screen displayed on the operation unit in the image processing apparatus.

Functions provided by the apparatus of the present invention are classified into three categories "copy", "transmission" and "box", which corresponds to three main tabs (copy/transmission/box) (3011, 3012 and 3013) displayed on an upper portion on the operation screen shown in FIG. 4. By depressing (touching) these main tabs, switching to a screen of each category is performed. In a case where the switching to another category is not permitted, display colors of the main tabs are changed, and even if the main tabs are depressed, there is no reaction for the depression.

The category "copy" includes a function of ordinarily copying documents using the scanner and the printer included in the own apparatus and a function (remote copy) of copying the documents using the scanner included in the own apparatus and a printer connected through a network. The category "transmission" means a function of transferring data of the documents put on the scanner included in the own apparatus to an E-mail, a remote printer, a facsimile apparatus, FTP (file transfer protocol) and a database, and it is possible to designate plural addresses. With respect to the category "box", data is once stored into the HDD 2004, then a printing operation can be arbitrarily performed, in a case where the printing operation is performed from a personal computer using the printer in the own apparatus, and a function of storing the data into the HDD 2004 upon reading the data of the documents from the scanner in the own apparatus is included. The data stored into a box in the HDD 2004 can be printed according to an instruction, which is in a box screen (not shown) displayed on the operation unit 2012, from the user.

Figure 5:
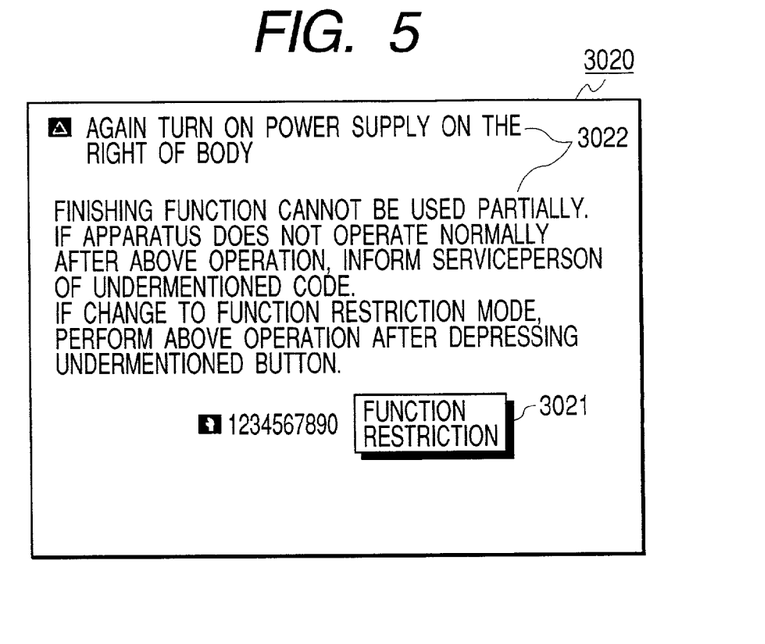
FIG. 5 is a view showing an example of an avoidable error display displayed on the operation unit in the image processing apparatus.

An error screen shown in FIG. 5 is displayed when an error (service call error), to which a serviceperson is necessary, occurred. The error screen includes a message display area 3022 for displaying an error message in text, and a function restriction key 3021, which can be depressed by the user, used for shifting to a function restriction mode by avoiding an error state. It is controlled to shift to the function restriction mode in accordance with the depression of the function restriction key 3021 by the user.

The function restriction mode is such the mode which causes the image processing apparatus to operate so as to process a job, which can be processed without the influence of an error occurred unit, without stopping the whole system, in a case where the error occurred in a certain unit among the plural units, and makes the image processing apparatus available within a range of the function, which is not influenced by the error, among the plural functions included in the image processing apparatus. For example, in a case where the stapler unit in the finisher 2100 is in a breakdown, only the execution of stapling function is inhibited, and an operation based on other functions is permitted. Besides, for example, in a case where the printer unit is in a breakdown, a process of inputting image data from the scanner unit or an external device is permitted, and the image processing apparatus is operated such that a function of transmitting the image data to another device or a function of storing the data into the box in the HDD 2004 of the own apparatus is activated. The CPU 2001 judges that the error occurred in which the unit, and further judges that what the function is activated or inactivated on the basis of various information including the error information and the like obtained by the communication between the CPU 2001 and each unit. Such the information is stored into the SRAM 2200 or the HDD 2004. In case of executing the drive under the function restriction mode in accordance with the depression of the function restriction key 3021 done by the user, the CPU 2001 controls to display a fact that the image processing apparatus is driven under the function restriction mode on the operation unit discriminatingly for the user (refer to a later-described screen shown in FIG. 4).

On the other hand, in a case where the corresponding screen is closed without depressing the function restriction key 3021 by the user, the shift to the function restriction mode is inhibited to control that use of the image processing apparatus is entirely inhibited (i.e., whole system is stopped, and all the plural functions included in the image processing apparatus are inhibited to used).

It should be noted that, for example, a password or the like may be prepared such that only the manager can select permission or inhibition of the shift to the function restriction mode when the error occurred.

When an unavoidable error occurs, an error screen (not shown), which does not have the function restriction key 3021 and differs from the screen shown in FIG. 5, is to be displayed. Various controls including the above display control are performed by the CPU 2001. As mentioned above, the CPU 2001 determines the display contents of the screen on the basis of information from the various units (the scanner unit, the printer unit, the finisher unit, and the like).

A message section 3014 in the screen shown in FIG. 4 is an area for displaying various states depending on each category (copy/transmission/box). A status section 3015 is used to display information, which is not displayed in the message section 3014, with a state of not concerning with the category of a currently opened screen, or depending on the category of the currently opened screen. The status section 3015 is an area for displaying a fact that the function restriction mode is now functioning, in a case where the image processing apparatus is operated under the function restriction mode in accordance with the depression of the key 3021 done by the user in the above screen in FIG. 5. In this case, a displaying operation for enabling the user to discriminate that what the function can not be used, is performed. For example, in a case where the image processing apparatus is operated under the function restriction mode because a finishing function can not be used, a message "finishing function can not be used partially" as shown in FIG. 4 is to be displayed. By this kind of notification to the user, the user can confirm that the function restriction mode is now functioning, and can visually confirm that what the function can not be used. In this manner, in the embodiment, in a case where the error occurred, it is controlled that not only an error notification but also a notification, which enables the user to discriminate that the image processing apparatus is operated under the function restriction mode, are performed. In the embodiment, a function key corresponding to the function which is inhibited to use is to be displayed with shading to disable the user from selecting the function, thereby controlling to inhibit an operation of that function (refer to a key 3017). A soft-tally 3016, which lights in blue in a normal operation and in red in an abnormal operation, is used to notify the own apparatus condition.

Figure 7:
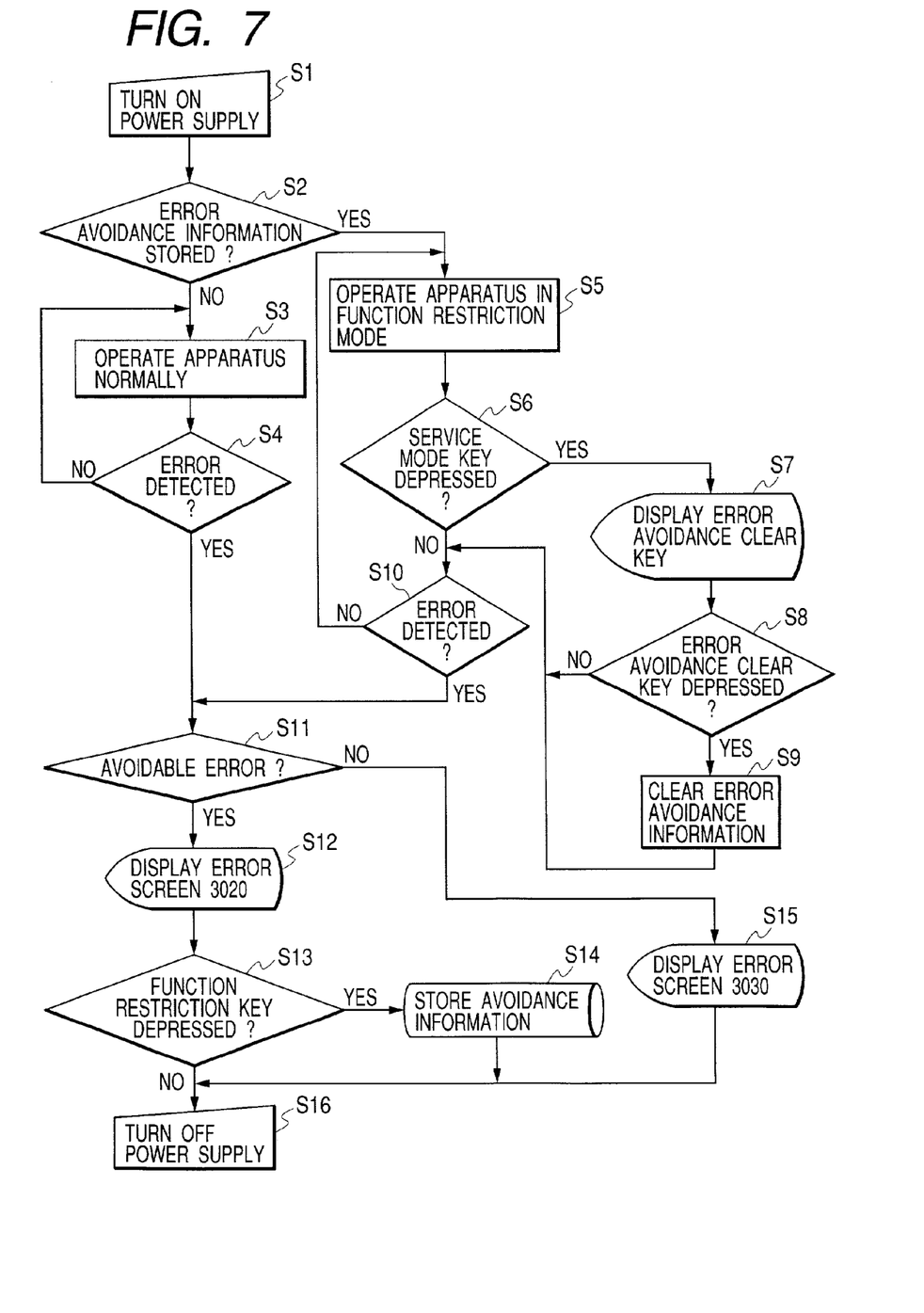
FIG. 7 is a flow chart of a control regarding an avoidable error in the image processing apparatus.

FIG. 7 is a flow chart of a control regarding the function restriction mode. A program for executing this flow chart is stored into the ROM 2003 or the HDD 2004 and is executed by the CPU 2001. At first, when a power supply switch of the image processing apparatus is turned on (step S1), the CPU 2001 checks whether or not error avoidance information (stored in a step S14 described later) is stored into the SRAM 2200 (step S2), and if that information is not stored, the image processing apparatus is operated by the normal drive (all of the plural functions included in the image processing apparatus operate in available state) (step S3), then the flow advances to a step S4. In the normal drive, all of the devices mechanically connected to the image processing apparatus is to be usable (all of the plural functions included in the image processing apparatus is to be usable). In the step S4, an error detection is performed on the basis of the communication result in communication with each unit or the error information included in information obtained from each unit, and if the error is not detected, the flow returns to the step S3, and if the error is detected, the flow advances to a step S11.

In the step S2, when it is judged that the error avoidance information is stored, it is controlled to shift to the function restriction mode (step S5). In the function restriction mode drive, the CPU 2001 stops to communicate with a device in the abnormal state or a part of that device in accordance with the error avoidance information stored into the SRAM 2200, and notifies that fact to the operation unit 2012 through the operation unit I/F 2006. For example, in a case where the error in the finisher 2100 is included in the error avoidance information, on the operation screen, a fact that the apparatus is in the function restriction mode is to be displayed in the status section 3015 in a setting screen as shown in FIG. 4, and it is controlled that the setting key 3017 for the function related to the finisher 2100 is to be displayed with shading, then an input of the setting key 3017 is inactivated. At this time, the image processing apparatus can normally operate for the functions other than the function related to the finisher 2100. And, for example, in a case where the error avoidance information includes an error occurred in a double-face unit (not shown) included in the printer 2095, it is controlled that a "double-face key" in the setting screen in FIG. 4 is to be displayed with shading, and the user can not select that key.

As above, among the plural functions included in the image processing apparatus, the corresponded function key is inactivated so as to inhibit the use of the function influenced by the error, and the corresponded function key is activated to be selected by the user so as to permit the use of the function not influenced by the error.

In the embodiment, it is controlled to display a key, which is used to select permission or inhibition of the function restriction mode, on the operation unit together with the error information (refer to FIG. 5) to control that the user determines whether or not the function restriction mode, which inhibits the use of the function influenced by the error and permits the use of the function not influenced by the error, should be executed, and the selection is to be made by the user.

Accordingly, such the inconvenience of arbitrarily operating the apparatus in a state of restricting the function due to the individual judgment of the apparatus although the drive under the function restriction mode is not desired, or such the inconvenience of disabling the user from executing a desired function because of stopping the entire system due to the error occurrence in another function in case of intending to execute the desired function, can be prevented. As a result, a managed operation in consideration of user's will in the use of the image processing apparatus and use environment of the image processing apparatus can be performed.

After shifting to the function restriction mode, it is judged whether or not a service mode key on a screen, which is displayed by depressing an application mode key 3018 on the screen shown in FIG. 4, is depressed (step S6). When the service mode key is depressed, a screen including an error avoidance clear key is displayed (step S7), and it is judged whether or not the error avoidance clear key is depressed (step S8). When the error avoidance clear key is depressed, the error avoidance information is cleared from the SRAM 2200 (step S9), then the flow advances to a step S10. When the error avoidance clear key is not depressed, and also when the service mode key is not depressed in the step S6, the flow advances to the step S10, where the error detection is performed. In this case, when the error is not detected, the flow returns to the step S5, and when the error is detected, the flow advances to a step S11.

When the error is detected in the step S4, and also when the error is detected in the step S10, it is judged whether or not that error is avoidable (step S11). A fact that the error is avoidable or unavoidable is judged from an error occurred portion.

For example, when the error occurred in the finisher 2100, since the normal operation can be performed with respect to a printing operation, a copying operation and a transmitting operation which don not use the finisher 2100, it becomes avoidable by disabling the user from setting a mode of using the finisher 2100. When the error occurred in the printer 2095, since the normal operation can be performed with respect to the transmitting operation, it becomes avoidable by disabling the user from selecting the printing operation and the copying operation. When the error occurred in the scanner 2070, since the normal operation can be performed with respect to the printing operation itself, it becomes avoidable by disabling the user from selecting the copying operation and the transmitting operation, that is, for example, by enabling the user to select a facsimile reception printing function, a printing function of printing data received from a computer, a box function of printing data already stored into the box in the HDD 2004, or the like. As an example incapable of avoiding the error, for instance, when the errors occurred in the scanner image processing unit 2080, the printer image processing unit 2090, the image rotation unit 2030, the image compression unit 2040, an image processing board having the image bus I/F 2005, since any of the copying operation, the printing operation and the transmitting operation can not be normally operated, it becomes unavoidable.

Figure 6:
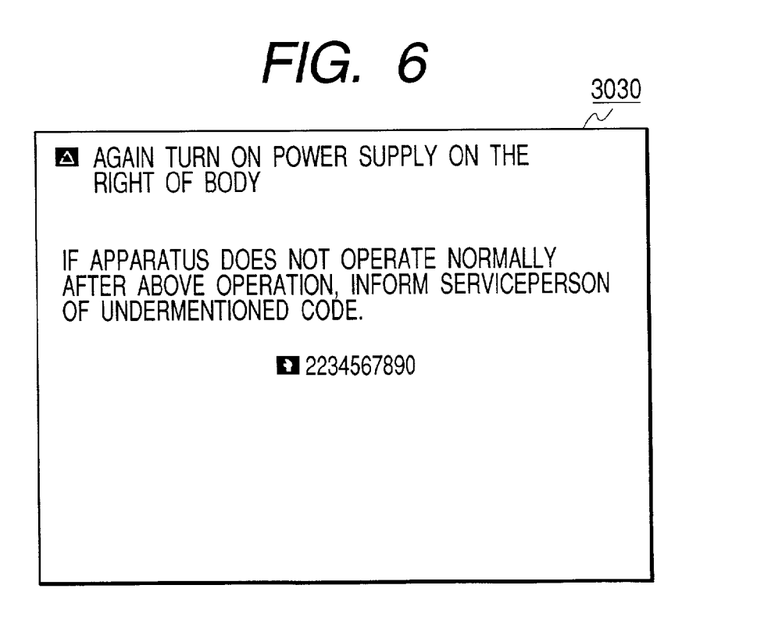
FIG. 6 is a view showing an example of an unavoidable error display displayed on the operation unit in the image processing apparatus.

When it is judged that the error is avoidable, the error information and a fact that the error is avoidable are notified to the operation unit 2012 through the operation unit I/F 2006. The operation unit, which received avoidable error information, displays the error screen shown in FIG. 5 on the screen of the operation unit 2012 (step S12). On this error screen, the function restriction key 3021 for the error avoidance is provided, and the error avoidance information is to be stored into the SRAM 2200 (step S14) in accordance with the depression of the function restriction key 3021 (step S13). The error avoidance information is such the information of being used to specify the device or a part of the device, to which the error avoidance operation has to be performed (to be electrically separated, or the CPU 2001 does not perform communication) when the power is turned on. For example, when the error related to the whole finisher 2100 occurred, information of the finisher 2100 is stored as a device, to which the error avoidance operation has to be performed. When the error related to the stapler in the finisher 2100 occurred, information of the stapler is stored as a part of the device, to which the error avoidance operation has to be performed (similar to the error avoidance in a punching unit, a folding unit and a binding unit other than the stapler unit). When it is judged that the error is unavoidable in the step S11, an error screen 3030 shown in FIG. 6 is displayed on the screen of the operation unit 2012 (step S15). On this screen 3030, the function restriction key is not displayed differently from the error screen shown in FIG. 5. When the error is detected in the step S4, and also detected in the step S10, a standby state is kept until the power supply switch is turned off by the user.

A serviceperson who received a call from a user visits this user, and a device or a part of the device in the error occurrence is repaired or exchange (step S16) after turning off the power switch of the image processing apparatus. Thereafter, when the serviceperson turns on the power switch of the image processing apparatus, since the error avoidance information is still stored into the SRAM 2200 at this time, the drive under the function restriction mode is restarted. At this point, the serviceperson acts to display the error avoidance clear key by depressing the above service mode key, and the error avoidance information can be deleted from the SRAM 2200 by depressing the error avoidance clear key. Then, the power switch of the image processing apparatus is once turned on and off, whereby a normal drive is started (it is controlled to switch from the drive under the function restriction mode to the normal drive). In the above description, the constitution capable of deleting the error avoidance information under a service mode was explained. However, it may be constituted that the error avoidance information can also be deleted under a user mode, and the user can perform the similar operation.

In the above example, it is controlled to display a setting screen having the function restriction key 3021 as shown in FIG. 5 on the operation unit 2012 of the image processing apparatus, in a case where the error occurred in the image processing apparatus and any function among the plural functions can not be executed. However, it may be controlled that the setting screen is displayed on an operation unit of an external device such as a remote computer or the like capable of communicating with the image processing apparatus, and an instruction, which indicates whether or not the drive under the function restriction mode should be executed, is output from the external device side to the image processing apparatus in accordance with the selection by the key 3021 on the setting screen in the external device, whereby it may be controlled whether or not the drive under the function restriction mode should be executed at the image processing apparatus side.

For example, in case of giving a print job from the external device to the image processing apparatus, or outputting a status request command used for confirming status of the image processing apparatus to the image processing apparatus, when any function is inexecutable at the image processing apparatus side, the image processing apparatus transmits information indicating the above fact (error information, information used for specifying what function can not be used, or the like) to the external device. Upon receiving the information, it is controlled to display the setting screen in FIG. 5 on a display unit of the external device, at the image processing apparatus side. Thereafter, when the key 3021 is depressed in the screen, it is controlled to transmit an instruction used for permitting the drive execution under the function restriction mode to the image processing apparatus. Accordingly, the drive under the function restriction mode is to be executed. Then, a display of information capable of discriminating a fact that the drive is executed under the function restriction mode as shown in FIG. 4 is simultaneously performed at the external device, and a display control is performed so as to activate the function permitted to use and inactivate the function inhibited to use. On the other hand, when the setting screen is closed without depressing the key 3021, it is controlled to transmit an instruction used for inhibiting execution of the drive under the function restriction mode, to the image processing apparatus. Accordingly, execution of the drive under the function restriction mode is inhibited to inactivate all the functions included in the image processing apparatus. In this manner, permission or inhibition for the execution of the drive of the image processing apparatus under the function restriction mode may be controlled at the external device side.

The embodiment is applicable to a system composed of plural equipments (a host computer, an interface equipment, a reader, a printer, etc.) or to an apparatus including a single equipment (a compact image processing equipment such as a PDA (personal digital assistant), a copying machine, a facsimile apparatus, and the like).

It is needless to say that the present invention is also applicable to a case of achieving an object by supplying the program to a system or an apparatus. The storage medium storing the program codes represented by a software for realizing the present invention is supplied to a system or an apparatus and then a computer (or CPU or MPU) in the system or the apparatus reads and executes the program codes stored in the storage medium, whereby it becomes possible to obtain an effect of the present invention.

In this case, the program codes themselves read from the storage medium are to realize the functions of the above embodiment, and the storage medium storing such the program codes constitutes the present invention.

The storage medium for supplying the program codes can be, for example, a floppy disk, a hard disk, an optical disk, a magnetooptical disk, a CD-ROM (compact disk ROM), a CD-R (compact disk recordable), a magnetic tape, a non-volatile memory card (IC (integrated circuit) memory card), a ROM (e.g., mask ROM, flash EEPROM (electrically erasable, programmable ROM)), or the like.

It is needless to say that the present invention also includes not only a case where the functions of the above embodiment are realized by the execution of the program codes read by the computer, but also a case where an OS (operating system) or the like functioning on the computer executes all the process or a part thereof according to the instruction of the program codes, thereby realizing the functions of the above embodiment.

Further, it is needless to say that the present invention further includes a case where the program codes read from the storage medium are once written in a memory provided in a function expansion board inserted in the computer or a function expansion unit connected to the computer, then a CPU or the like provided in the function expansion board or the function expansion unit executes all the process or a part thereof according to the instructions of such the program codes, thereby realizing the functions of the above embodiment.

As explained above, according to the present embodiment, the error occurred in the image processing apparatus is detected in the image processing apparatus having the plural functions, and the screen, which includes the function restriction key used for selecting whether or not a mode for operating the image processing apparatus under the function restriction state should be executed, is displayed in accordance with the obtained detection, and the user is made to select whether or not the mode should be executed. Therefore, a managed operation reflecting the user's will in using the image processing apparatus, use environment of the apparatus, and the like can be performed. Further, when the user desires an operation under a condition of restricting the function, the user has only to depress the corresponding key. As a result, it becomes possible to shift to the mode of using the image processing apparatus while restricting the function related to the error with simple operation, and the image processing apparatus can be effectively used during the restoration of the error.

In accordance with the depression of the function restriction key, since execution of the function corresponding to the detected error is restricted, even if the error related to any function occurs, the user can restrict the function in the error occurrence by only depressing the displayed function restriction key without recognizing that what the function has to be restricted and requesting such the inconvenience of determining the function to be restricted by the user after considering the error state.

Further, in accordance with the depression of the function restriction key, since a fact that the function is restricted is displayed on a screen for performing the setting of the image processing apparatus, the user is not confused even if the user intends to set the function without understanding that the function is restricted.

Further, in accordance with the depression of the function restriction key, since the communication between an error detected device and a control means is not performed, the error occurred device has not to be physically separated. As a result, the user is not suffered from the inconvenience.

Further, in accordance with the depression of the function restriction key, since information related to the function to be restricted is stored into a nonvolatile storage means, an error display has not to be re-performed due to the same error when the power of the image processing apparatus is turned on again.

In accordance with that the power of the image processing apparatus is turned on, since the information stored into the storage means is read, and the function in the image processing apparatus is restricted in accordance with the read information, the function restriction key has not to be depressed by the user due to the same error.

Since an input of a function setting key for the function corresponding to the detected error is inactivated, the user does not erroneously set the restricted function.

Since it is discriminated whether or not the detected error comes to be able to normally operate by restricting the function of the image processing apparatus, and a screen corresponding to the discriminated result is displayed, the above effect can be obtained in such the image processing apparatus, in which both the error which can not normally operate even if the function is restricted and the error of which a part can normally operate by restricting the function may be occurred.

When it is judged that the error comes to be able to normally operate by restricting the function of the image processing apparatus, since a screen which includes the function restriction key is displayed, the function restriction can be performed only when the function restriction gives an effect to the error.

When it is judged that the error does not come to be able to normally operate by restricting the function of the image processing apparatus, since a screen which does not include the function restriction key is displayed, the user is not confused by displaying the function restriction key when the function restriction does not give an effect to the error.

What is claimed is:

1. A control method for a device capable of performing a plurality of functions including a first function and a second function, said method comprising the steps of:

enabling a reception of a specific user request for permitting an execution of a job which needs an operation of the second function and does not need an operation of the first function by the device, in case that the operation of the first function by the device cannot be performed and that the operation of the second function by the device can be performed;

inhibiting the execution of the job which needs the operation of the second function and does not need the operation of the first function by the device, even if the operation of the second function can be performed by the device, in case that the reception of the specific user request is not performed; and permitting the execution of the job which needs the operation of the second function and does not need the operation of the first function by the device, in case that the reception of the specific user request is performed and in case that the operation of the first function by the device cannot be performed and the operation of the second function can be performed by the device.

2. A device for executing the control method described in claim 1.

3. A storage medium which stores a computer-readable program for executing the control method described in claim 1.

4. A control method according to claim 1, wherein said method enables reception of the specific user request from a user of the device through a user interface unit provided in the device.

5. A device for executing the control method described in claim 4.

6. A storage medium which stores a computer-readable program for executing the control method described in claim 4.

7. A control method according to claim 1, wherein said method enables reception of the specific user request from a user of an external device, through a user interface unit provided in the external device capable of performing data communication with the device.

8. A device for executing the control method described in claim 7.

9. A storage medium which stores a computer-readable program for executing the control method described in claim 7.

10. A control method according to claim 1, wherein said method enables reception of the specific user request from a user of a remote computer, through a specific display performed by a display unit of the remote computer, and wherein the display unit is capable of performing the display to enable a user to confirm the status of the device.

11. A device for executing the control method described in claim 10.

12. A storage medium which stores a computer-readable program for executing the control method described in claim 10.

13. A control method according to claim 1, wherein
said method permits the execution of the job which needs the operation of the second function and does not need the operation of the first function by the device, even if a reboot of the device via a user operation is performed, in case that the reception of the specific user request is performed.

14. A device for executing the control method described in claim 13.

15. A storage medium which stores a computer-readable program for executing the control method described in claim 13.

16. A control method according to claim 1, wherein each of the first function and the second function includes at least one of:
a print function that prints using a printer unit of the device,
a remote print function that prints data input by the device, using a printer unit of another device,
a transmission function that transmits data from the device to the other device, and
a storage function that stores data in a data storage unit provided in the device.

17. A device for executing the control method described in claim 16.

18. A storage medium which stores a computer-readable program for executing the control method described in claim 16.

19. A control method according to claim 1, wherein the device is capable of performing a print operation using a print function as the second function and a finishing operation for a print medium using a finishing function as the first function.

20. A device for executing the control method described in claim 19.

21. A storage medium which stores a computer-readable program for executing the control method described in claim 19.

22. A control method according to claim 1, wherein the device is capable of performing a data transmission operation to another device using a data transmission function as the second function and a print operation using a print function as the first function.

23. A device for executing the control method described in claim 22.

24. A storage medium which stores a computer-readable program for executing the control method described in claim 22.

25. A control method according to claim 1, wherein the device is a device capable of performing a data storage operation in a data storage unit of the device using a data storage function as the second function and a print operation using a print function as the first function.

26. A device for executing the control method described in claim 25.

27. A storage medium which stores a computer-readable program for executing the control method described in claim 25.

28. A control method according to claim 1, wherein:
said control method permits reception of the specific user request from a user when the operation of the first function cannot be performed and the operation of the second function can be performed by the device, and
said control method inhibits reception of the specific user request from the user when both the operations of the first function and the second function cannot be performed by the device.

29. A device for executing the control method described in claim 28.

30. A storage medium which stores a computer-readable program for executing the control method described in claim 28.

31. A control method according to claim 1, wherein:
said control method enables reception of the specific user request from a user through a specific display key being the display target by a user interface when the operation of the first function cannot be performed and the operation of the second function can be performed by the device, and
said control method inhibits reception of the specific user request from the user through the specific display key being the display target by the interface when both the operations of the first function and the second function cannot be performed by the device.

32. A device for executing the control method described in claim 31.

33. A storage medium which stores a computer-readable program for executing the control method described in claim 31.

34. A control method according to claim 1, further comprising the step of:
causing a user interface unit to perform an error display notifying a user of error information and to perform a specific display enabling reception of the specific user request from the user when the operation of the first function cannot be performed and the operation of the second function can be performed by the device, wherein the user interface unit performs the error display without performing the specific display when both the operations of the first function and the second function cannot be performed by the device.

35. A device for executing the control method described in claim 34.

36. A storage medium which stores a computer-readable program for executing the control method described in claim 34.

37. A control method according to claim 1, wherein reception of the specific user request from a specific user is enabled using a password.

38. A device for executing the control method described in claim 37.

39. A storage medium which stores a computer-readable program for executing the control method described in claim 37.

40. A control method according to claim 1, wherein when the specific user request is received, said control method causes a user interface unit to perform a first display enabling a user to confirm that the first function cannot be used and causes the user interface unit to perform a second display enabling the user to confirm that the operation of the second function can be performed.

41. A device for executing the control method described in claim 40.

42. A storage medium which stores a computer-readable program for executing the control method described in claim 40.

* * * * *

UNITED STATES PATENT AND TRADEMARK OFFICE
CERTIFICATE OF CORRECTION

PATENT NO. : 7,227,651 B2
APPLICATION NO. : 10/077796
DATED : June 5, 2007
INVENTOR(S) : Yuka Kamiya It is certified that error appears in the above-identified patent and that said Letters Patent is hereby corrected as shown below:

COLUMN 3:
Line 55, "corresponds" should read --correspond--.

COLUMN 4:
Line 44, "the" (first occurrence) should be deleted and "that what" should read --whether--.
Line 63, "to" should read --from being--.

COLUMN 5:
Line 13, "of not concerning" should read --not concerned--.
Line 22, "that what" should read --whether--.
Line 29, "that what" should read --whether--.
Line 36, "to use" should read --from being used,--.
Line 55, "is" should read --are--.
Line 56, "is" should read --are--.

COLUMN 6:
Line 14, "occurred" should read --having occurred--.
Line 20, "corresponded" should read --corresponding--.
Line 22, "corresponded" should read --corresponding--.

COLUMN 7:
Line 4, "don" should read --do--.

COLUMN 9:
Line 26, "all the" should read --the entire--.
Line 35, "all the" should read --the entire--.
Line 64, "that what" should read --whether--.

COLUMN 10:
Line 10, "has not" should read --does not have--.
Line 11, "is not suffered" should read --does not suffer--.
Line 15, "has not" should read --does not have--.
Line 22, "has not" should read --does not have--.
Line 28, "comes to be able to" should read --can--.
Line 35, "be occurred." should read --occur.--.
Line 36, "comes to be able to" should read --can--.
Line 42, "does not come to be able to" should read --is unable--.

UNITED STATES PATENT AND TRADEMARK OFFICE
CERTIFICATE OF CORRECTION

PATENT NO. : 7,227,651 B2
APPLICATION NO. : 10/077796
DATED : June 5, 2007
INVENTOR(S) : Yuka Kamiya It is certified that error appears in the above-identified patent and that said Letters Patent is hereby corrected as shown below:

COLUMN 12:
Line 55 Claim 31, "interface" should read --user interface--.

Signed and Sealed this

Sixth Day of May, 2008

JON W. DUDAS
*Director of the United States Patent and Trademark Office*